(12) United States Patent
Matsumura

(10) Patent No.: US 8,325,189 B2
(45) Date of Patent: Dec. 4, 2012

(54) INFORMATION PROCESSING APPARATUS CAPABLE OF EASILY GENERATING GRAPH FOR COMPARING OF A PLURALITY OF COMMERCIAL PRODUCTS

(75) Inventor: Norikazu Matsumura, Tokyo (JP)

(73) Assignee: NEC Biglobe, Ltd., Tokyo (JP)

(*) Notice: Subject to any disclaimer, the term of this patent is extended or adjusted under 35 U.S.C. 154(b) by 467 days.

(21) Appl. No.: 12/585,790

(22) Filed: Sep. 24, 2009

(65) Prior Publication Data

US 2010/0079464 A1    Apr. 1, 2010

(30) Foreign Application Priority Data

Sep. 26, 2008 (JP) ................................. 2008-248116

(51) Int. Cl.
  *G06T 11/20* (2006.01)
  *G06F 17/00* (2006.01)
  *G06F 15/18* (2006.01)
  *G09G 5/00* (2006.01)
(52) U.S. Cl. .......... 345/440; 345/418; 345/619; 706/12; 706/55
(58) Field of Classification Search .......... 345/440, 345/619, 418; 715/708; 706/12, 55, 62; 707/690; 705/1, 8, 500
See application file for complete search history.

(56) References Cited

U.S. PATENT DOCUMENTS

| | | | |
|---|---|---|---|
| 6,622,140 B1 | 9/2003 | Kantrowitz | |
| 6,631,365 B1 * | 10/2003 | Neal et al. | 707/690 |
| 7,523,085 B2 * | 4/2009 | Nigam et al. | 706/55 |
| 7,877,345 B2 * | 1/2011 | Nigam et al. | 706/55 |
| 8,010,480 B2 * | 8/2011 | Dave et al. | 706/62 |
| 8,041,669 B2 * | 10/2011 | Nigam et al. | 706/55 |
| 2006/0069589 A1 * | 3/2006 | Nigam et al. | 705/1 |
| 2006/0177808 A1 * | 8/2006 | Aosawa et al. | 434/322 |
| 2006/0288285 A1 * | 12/2006 | Lai et al. | 715/708 |
| 2009/0254399 A1 * | 10/2009 | Cristol | 705/8 |
| 2010/0185564 A1 * | 7/2010 | King et al. | 705/500 |
| 2011/0093417 A1 * | 4/2011 | Nigam et al. | 706/12 |

FOREIGN PATENT DOCUMENTS

| | | |
|---|---|---|
| JP | 2003-157255 | 5/2003 |
| JP | 2004-514220 | 5/2004 |
| JP | 2007-172179 A | 7/2007 |

OTHER PUBLICATIONS

Yamanishi, et al., "CGM mining and knowledge organization, information processing", Japan, Information Processing, Society of Japan, Aug. 15, 2008, vol. 48 No. 8, pp. 830-836.

(Continued)

*Primary Examiner* — Chante Harrison
(74) *Attorney, Agent, or Firm* — McGinn IP Law Group, PLLC

(57) ABSTRACT

An information processing apparatus includes a controller acquiring texts including each of a plurality of commercial product names to be analyzed, with respect to the respective commercial product names, from a storage device when the commercial product names are entered into the controller, extracting first phrases and second phrases from the acquired texts with respect to the commercial product names, the first phrases and the second phrases being classified as belonging to a first kind and a second kind, respectively, as expressions of evaluation of commercial products indicated by the commercial product names, and generating a graph representing evaluation points as values corresponding to the differences between counts of the first phrases and the second phrases.

6 Claims, 7 Drawing Sheets

OTHER PUBLICATIONS

Murata, et al., Text mining visualization system for numerical and named entity information from a large number of documents, Information Processing Society of Japan Technical Report (2008-NL-184), Japan, IPSJ, Mar. 27, 2008, vol. 2008, No. 33, pp. 25-32.

Japanese Office Action dated Jun. 9, 2010, with partial English translation.

Japanese Office Action dated Sep. 8, 2010, with partial English translation.

* cited by examiner

Fig.7

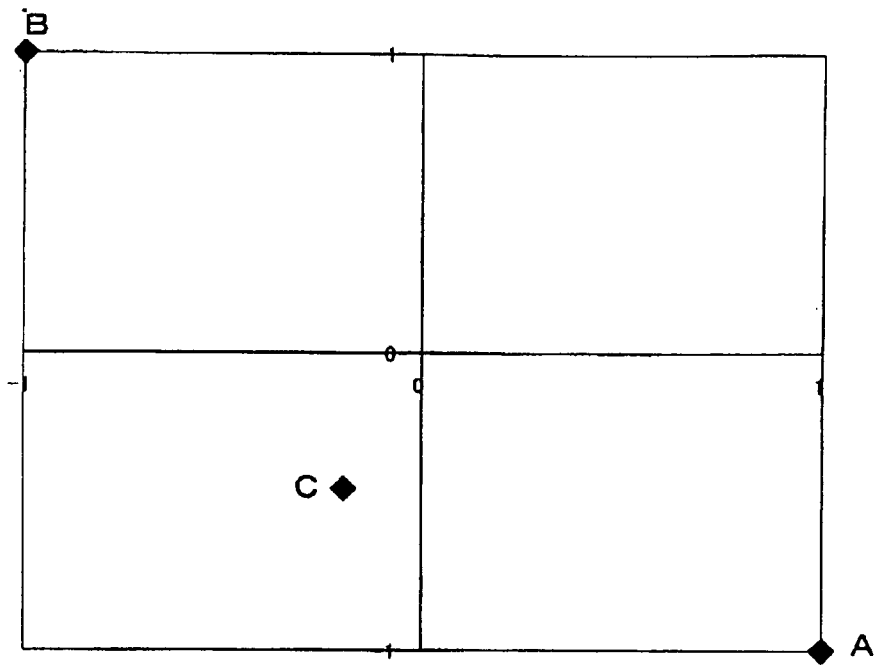

Fig.8 title: new product information
content: ···On X day X month, Company A has announced Personal Computer A as a new product at a cheap price. The features of the new product include a latest CPU and ···

Fig.9

| product name | PC A | PC B |
|---|---|---|
| attribute expressions | "price" | "price" |
| positive count | 80 | 30 |
| negative count | 5 | 40 |
| positive − negative | 75 | −10 |
| attribute expressions | "performance" | "performance" |
| positive count | 70 | 80 |
| negative count | 30 | 20 |
| positive − negative | 40 | 60 |
| attribute expressions | "design" | "design" |
| positive count | 5 | 95 |
| negative count | 60 | 2 |
| positive − negative | −55 | 93 |

INFORMATION PROCESSING APPARATUS CAPABLE OF EASILY GENERATING GRAPH FOR COMPARING OF A PLURALITY OF COMMERCIAL PRODUCTS

This application is based upon and claims the benefit of priority from Japanese Patent Application No. 2008-248116 filed on Sep. 26, 2008, the content of which is incorporated by reference.

BACKGROUND OF THE INVENTION

1. Field of the Invention

The present invention relates to an information processing apparatus for analyzing texts, an information processing method of analyzing texts, and a program for enabling a computer to carry out such an information processing method.

2. Description of the Related Art

When a company develops a new commercial product, it usually conducts a survey on the impressions that consumers have about the product and uses the information of the survey in developing a next commercial product. According to the survey, the company typically sends postal cards with questionnaires to consumers to collect feedback from the consumers about the commercial product, and gives giveaways to those consumers who have sent back the postal cards and have been chosen by a lottery.

With the widespread use in recent years of networks including the Internet, consumers are now likely to comment in their own blogs or other people's blogs on their impressions about commercial products. In addition, not only the consumers' impressions, but also the impressions of journalists from media such as newspapers and magazines are carried by columns in websites run by the media.

Therefore, companies are conjuring up ways of retrieving product impressions from texts including blogs run by individuals and articles produced by media. There have been developed many processes for automatically extracting reputation information, i.e., information about the evaluations of commercial products, with information processing apparatus. For example, JP-A No. 2007-172179 discloses a process for extracting reputation information in the form of a pair of expressions, i.e., an attribute expression and an evaluation expression. There is also known a process of visualizing reputation information about a single commercial product with a radar chart or a map diagram.

Hereinafter, a positive expression that is an expression representative of a commercial product evaluated as a positive image will be referred to as "positive" or "positive opinion", and a negative expression that is an expression representative of a commercial product evaluated as a negative image will be referred to as "negative" or "negative opinion".

The ratio between positive opinions and negative opinions is visualized as a circular graph or a band graph. The ratio between positive opinions and negative opinions will hereinafter be referred to as a "positive/negative ratio".

As described above, the result of a reputation analysis of a single commercial product is visualized by a circular graph or a band graph which indicates a positive/negative ratio. However, there has not been known in the art anything which shows a visualization of the result of a comparison between a plurality of commercial products, using texts disclosed on networks or texts stored in terminals or servers. In particular, no visualizing process has been available in the art for clarifying specific features and differentiating points of positives and negatives about each of a plurality of commercial products.

SUMMARY OF THE INVENTION

An exemplary object of the invention is to provide an information processing apparatus which is capable of easily generating a graph showing a comparison of the reputations of a plurality of commercial products, an information processing method, and a program for enabling a computer to carry out such an information processing method.

An apparatus according to an exemplary aspect of the invention includes a controller acquiring texts including each of a plurality of commercial product names to be analyzed, with respect to the respective commercial product names, from a storage device when the commercial product names are entered into the controller, extracting first phrases and second phrases from the acquired texts with respect to the commercial product names, the first phrases and the second phrases being classified as belonging to a first kind and a second kind, respectively, as expressions of evaluation of commercial products indicated by the commercial product names, and generating a graph representing evaluation points as values corresponding to the differences between counts of the first phrases and the second phrases.

The above and other objects, features and advantages of the present invention will become apparent from the following description with reference to the accompanying drawings which illustrate examples of the present invention.

BRIEF DESCRIPTION OF THE DRAWINGS

FIG. 7 is a diagram showing an example of a map diagram;

FIG. 8 is a diagram showing an example of a blog;

FIG. 9 is a table of accumulated counts of positives and negatives;

DETAILED DESCRIPTION OF THE EXEMPLARY EMBODIMENTS (1st Exemplary Embodiment)

Figure 1:
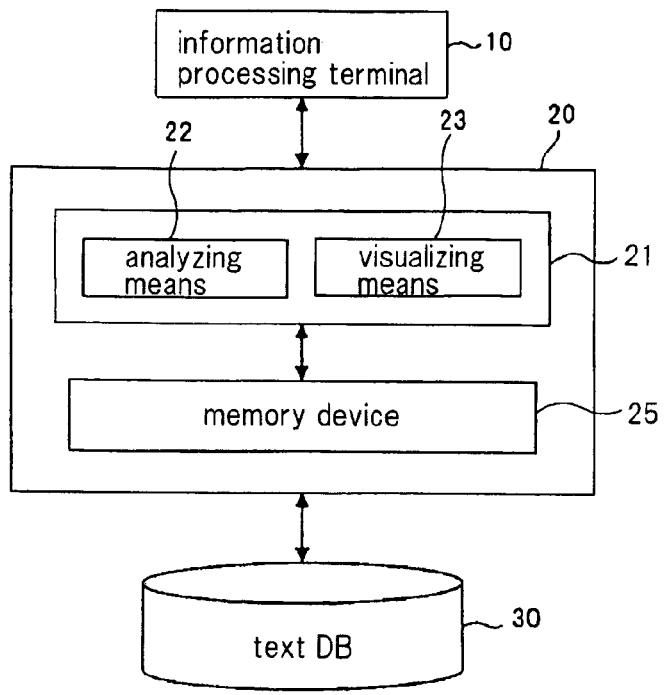
FIG. 1 is a block diagram which is illustrative of an information processing method according to a first exemplary embodiment of the present invention.

An information processing method according to a first exemplary embodiment of the present invention will be described below. FIG. 1 is a block diagram which is illustrative of the information processing method according to the first exemplary embodiment.

As shown in FIG. 1, text DB (DataBase) 30 storing texts to be analyzed and information processing terminal 10 to be operated by a user which uses an analytic service are connected to server apparatus 20 which analyzes texts. In FIG. 1, text DB 30 and information processing terminal 10 are shown as being directly connected to server 20 by respective communication lines. However, text DB 30 and information processing terminal 10 may be connected to server apparatus 20 by a network such as the Internet. Text DB 30 corresponds to a storage section according to the present invention.

Information processing terminal 10 and server apparatus 20 may be integrally combined with each other. If the apparatus shown in FIG. 1 are connected to each other by a network, then the text DB is not limited to a single text DB, but may comprise a plurality of text DBs. Two or more information processing terminals 10 may be connected to server apparatus 20 depending on the number of users involved. For the sake of brevity, it is assumed here that single text DB 30 and single information processing terminal 10 are connected to server apparatus 20.

Information processing terminal 10 comprises an information processing device of known nature such as a personal computer (hereinafter referred to as "PC"), a private digital assistant, or the like. Details of information processing terminal 10 will be described below. When the user of information processing terminal 10 operates information processing terminal 10 to enter the product names of a plurality of commercial products to be analyzed, information processing terminal 10 sends an analysis request signal including information representative of the product names and an analysis request to server apparatus 20. The analysis request signal may include not only the product names, but also information as to a retrieval formula for acquiring texts for the respective products.

As shown in FIG. 1, server apparatus 20 comprises controller 21 for performing an analytic process for analyzing texts stored in text DB 30 and a visualizing process for visualizing the results of the analytic process, and memory device 25 for storing data required for the analytic process. Controller 21 comprises analyzing means 22 and visualizing means 23. Controller 21 also includes a CPU (Central Processing Unit, not shown) for performing processes according to programs and a memory including a recording medium (not shown) for storing the programs. When the CPU performs the processes according to the programs, analyzing means 22 and visualizing means 23 are virtually configured in server apparatus 20.

Memory device 25 stores a list of evaluation expressions which serve as a basis for judging whether an opinion about a commercial product is positive or negative. According to the present invention, evaluation expressions of two kinds about commercial products include positive opinions and negative opinions, and the positive opinions belong to a first kind and the negative opinions to a second kind. Storage section 25 also stores a list of words for determining which classification axis an attribute expression or an evaluation expression of reputation information is to be related to.

A value which corresponds to the difference between a positive count and a negative count with respect to an attribute expression for a commercial product to be analyzed will hereinafter be referred to as "evaluation point". In the present exemplary embodiment, (positive count−negative count) is used as a type of evaluation point.

Figure 2:
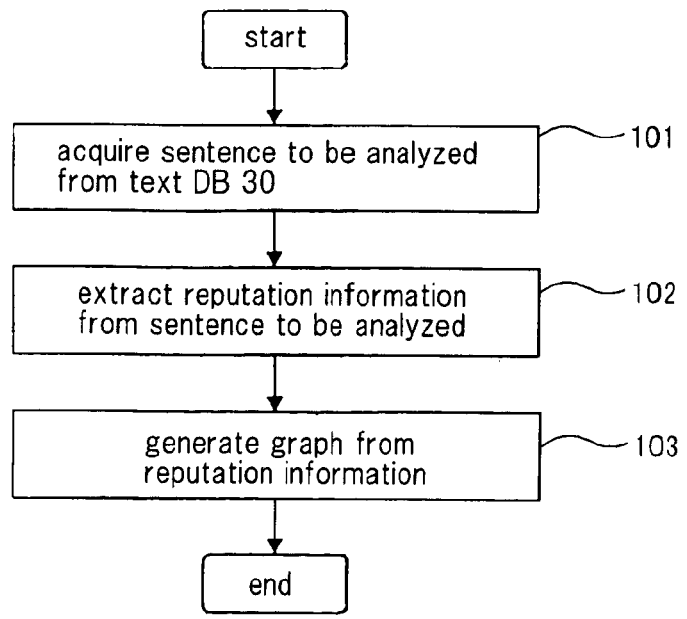
FIG. 2 is a flowchart of an operation sequence of a controller of a server apparatus shown in FIG. 1.

Operation of controller 21 will be described below. FIG. 2 is a flowchart of an operation sequence of controller 21 of server apparatus 20 shown in FIG. 1. When controller 21 receives an analysis request signal for analyzing a plurality of commercial products from information processing terminal 10, analyzing means 22 retrieves texts including the product names of the commercial products to be analyzed from text DB 30 and stores the retrieved texts into memory device 25 (step 101). It is assumed that texts represent sentences. Then, analyzing means 22 extract reputation information from the retrieved sentences (step 102).

Figure 3:
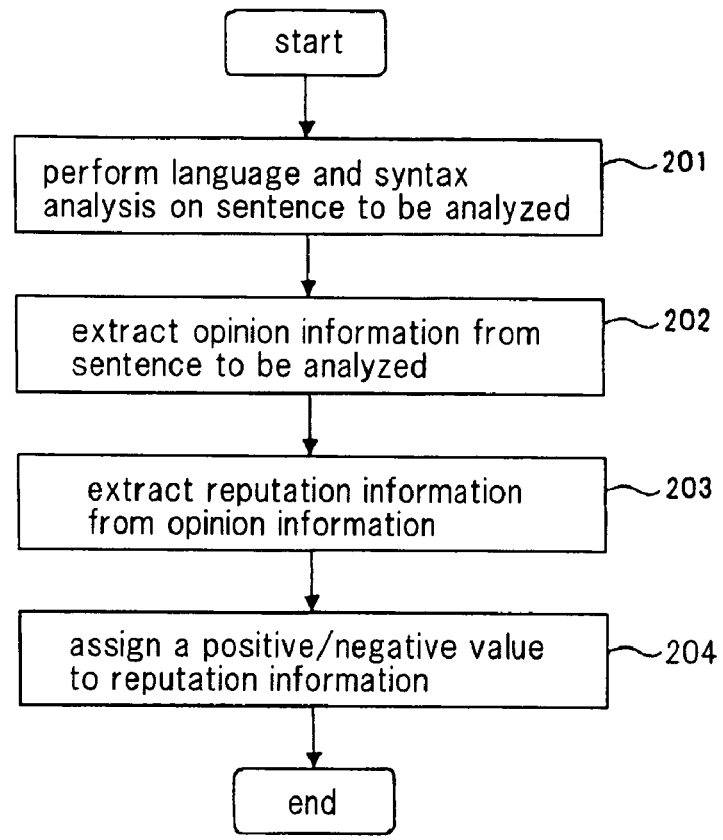
FIG. 3 is a flowchart of a process of extracting reputation information in step 102 shown in FIG. 2.

FIG. 3 is a flowchart of a process of extracting reputation information in step 102 shown in FIG. 2. As shown in FIG. 3, analyzing means 22 performs a language and syntax analysis on sentences by separating each sentence into words and extracting some modification relations between the words (step 201). An example of modification relation between the words of a sentence will be described below.

It is assumed that a sentence "I thought the flower was beautiful" is given. When a language and syntax analysis is performed to parse the given sentence, its result indicates "I [noun]→thought [verb], flower [noun]→beautiful [adjective], and beautiful [adjective]→thought [verb].

Then, analyzing means 22 extracts the modification relations: noun→verb and noun→adjective from the result of the language and syntax analysis, thereby extracting opinion information (step 202). For the above given sentence, analyzing means 22 extracts I [noun]→thought [verb], flower [noun]→beautiful [adjective] as opinion information from the above modification relations: I [noun]→thought [verb], flower [noun]→beautiful [adjective], and thought [verb] →beautiful [adjective].

Thereafter, analyzing means 22 performs a matching process on the list of evaluation expressions stored in memory device 25 and the evaluation expressions which correspond to the modified parts "verb" and "adjective" in the opinion information, and extracts the opinion information of the evaluation expressions which are in conformity with the evaluation expressions of the stored list, as reputation information (step 203).

If the evaluation expressions of the stored list include "cool" (positive), "beautiful" (positive), and "tacky" (negative), then the reputation information of the opinion information is only "flower"→"beautiful" (positive). The word "flower" corresponds to an attribute expression, and the word "beautiful" to an evaluation expression. Analyzing means 22 then assigns a positive/negative value (a flag indicative of a positive opinion or a negative opinion) that has been given to "beautiful" in the list of evaluation expressions, to the reputation information with respect to the attribute expression ("flower") included in the sentence (step 204).

Figure 4:
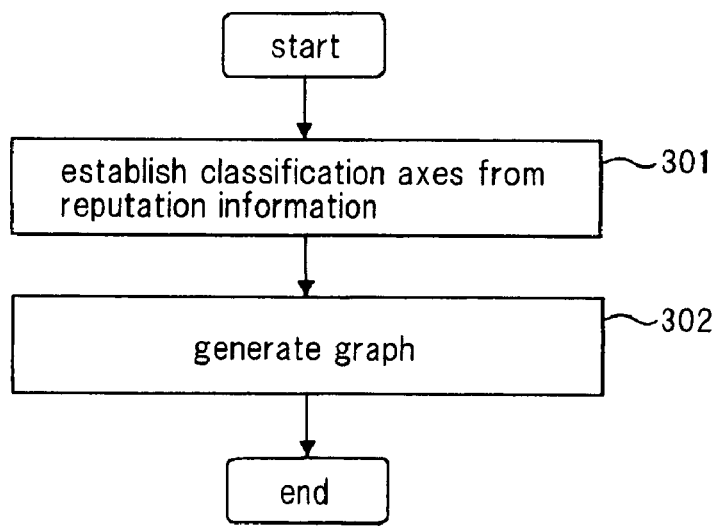
FIG. 4 is a flowchart of a process of generating a graph in step 103 shown in FIG. 2.

Then, visualizing means 23 receives the reputation information from analyzing means 22, and generates a graph from the received reputation information (step 103 in FIG. 2). FIG. 4 is a flowchart of a process of generating a graph in step 103 shown in FIG. 2.

As shown in FIG. 4, visualizing means 23 generates a list of classification axes related to the extracted reputation information, using the list of words stored in memory device 25. Then, visualizing means 23 stores the generated list of classification axes into memory device 25, and establishes the classification axes of the list for use in a graph (step 301).

Types of graphs that can be generated will be described below. Graphs for comparing commercial products include a bubble chart, a radar chart (standard mode and comparison mode), and a map diagram. The bubble chart is suitable for comparison of specific evaluations of a plurality of commercial products. The radar chart and the map diagram are suitable for comparison of evaluations of a plurality of commercial products or for comparison of evaluations for some refined classification axes.

After having set the classification axes, visualizing means 23 generates a graph (step 302) as described below. The graph generated by visualizing means 23 may be specified in advance or may be selected by visualizing means 23 according to the program. For example, if the graph is selected by visualizing means 23 according to the program, then the program may contain instructions for generating a bubble chart if there are only two commercial products to be compared and generating a radar chart and a map diagram if there are three or more commercial products to be compared.

In explaining each of the graphs, the following notations will be employed: It is assumed that classification axes X1 through X5 are used for the evaluation of commercial products A, B, C. "AX1posi" represents a positive count with respect to classification axis X1 for commercial product A, and "AX1nega" represents a negative count with respect to classification axis X1 for commercial product A. Similarly, "BX1posi" represents a positive count with respect to classification axis X1 for commercial product B, and "BX1nega" represents a negative count with respect to classification axis X1 for commercial product B, and CX1posi" represents a positive count with respect to classification axis X1 for commercial product C, and "CX1nega" represents a negative count with respect to classification axis X1 for commercial product C. "MAX(X1)" represents a maximum value in ranges "AX1posi-AX1nega", "BX1posi-BX1nega", "CX1posi-CX1nega", and "MIN(X1)" represents a maximum value in ranges "AX1posi-AX1nega", "BX1posi-BX1nega", "CX1posi-CX1nega".

Figure 5:
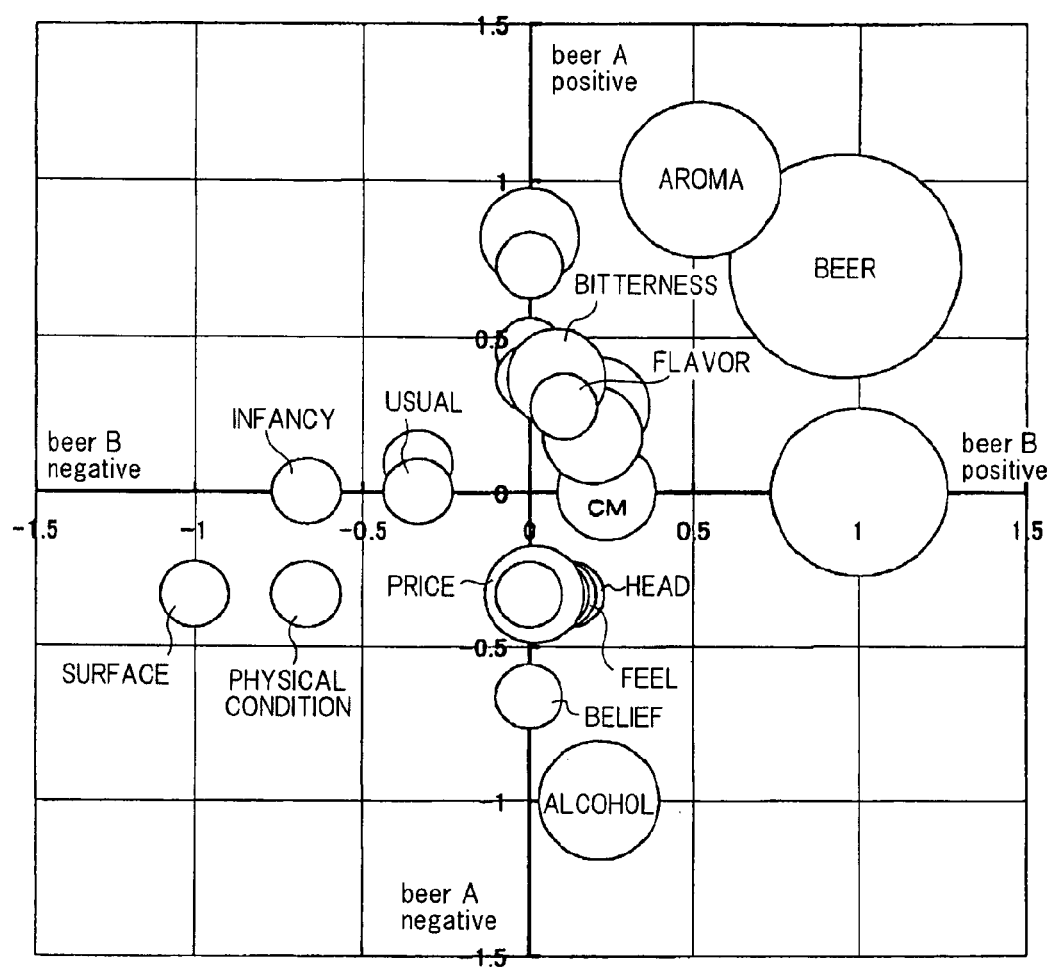
FIG. 5 is a diagram showing an example of a bubble chart.

FIG. 5 is a diagram showing an example of a bubble chart. A process of generating a bubble chart will be described in detail later with respect to Example 1. A way of interpreting a bubble chart will be described below.

The bubble chart shown in FIG. 5 indicates a comparison of evaluations of commercial products whose product names are "Beer A" and "Beer B". The bubble chart is divided into four areas by two perpendicular coordinate axes including vertical axis Y and horizontal axis X which represent Beer A and Beer B, respectively. The coordinates on the plane of the bubble chart indicate evaluation points (values corresponding to (positive count−negative count)) for attribute expressions of the articles. The tendencies of attribute expressions that are represented by circles positioned in the four areas will be described below.

In area 1 (X>0, Y>0), both Beer A and Beer B have many positives.

In area 2 (X>0, Y<0), only Beer B has many positives.

In area 3 (X<0, Y>0), only Beer A has many positives.

In area 4 (X<0, Y<0), both Beer A and Beer B have many negatives.

The size of the circles representing the attribute expressions is greater as the number of reputations of the attribute expressions is greater. As shown in FIG. 5, since the attribute expression "AROMA" has a greater Y coordinate than an X coordinate, it can be seen that Beer A has a higher evaluation than Beer B with respect to the attribute expression "AROMA". Furthermore, since the attribute expressions "HEAD", "FEEL" have a greater X coordinate than a Y coordinate, Beer B has a higher evaluation than Beer A with respect to these attribute expressions.

In the bubble chart shown in FIG. 5, the number of attribute expressions that are plotted is narrowed down to 20. Actually, more attribute expressions are plotted in bubble charts. However, if too many attribute expressions showing no significant differences between two commercial products are plotted in bubble charts, then attribute expressions showing significant differences between the two commercial products may become difficult to observe. Accordingly, as shown in FIG. 5, only a predetermined higher number of attribute expressions represented by circles whose sizes are greater than a given size may be plotted in bubble charts. A process of automatically selecting a predetermined higher number of attribute expressions represented by circles whose sizes are greater than a given size will be described later with respect to a second exemplary embodiment.

In the bubble chart shown in FIG. 5, the product names are represented by the coordinate axes. However, "commercial product×classification axis" may be represented by a coordinate axis. For example, "Beer A×price" and "Beer B×price" may be represented by the coordinate axes in the bubble chart shown in FIG. 5.

Figure 6A:
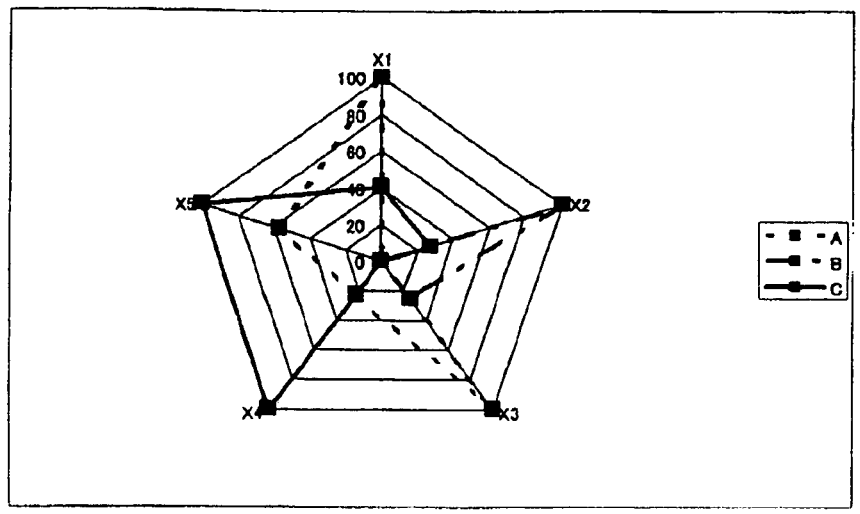
FIGS. 6A and 6B are diagrams showing examples of radar charts.
Figure 6B:
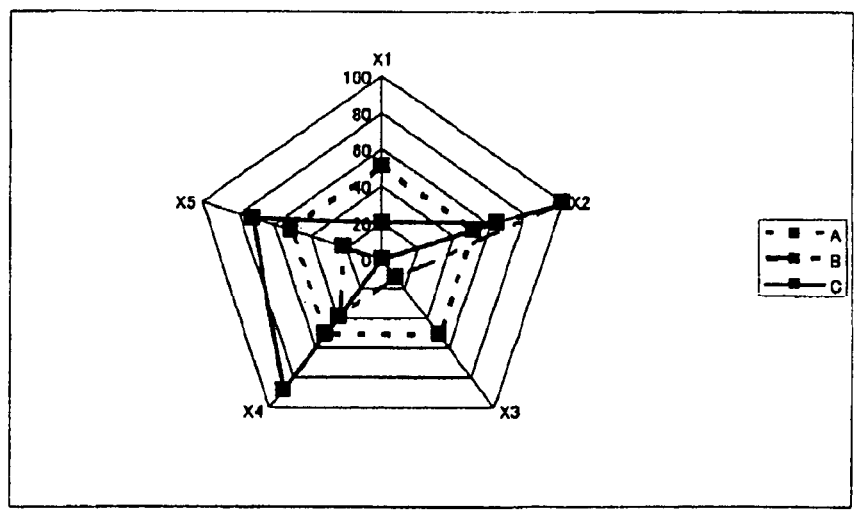

Processes of generating radar charts will be described below with reference to FIGS. 6A and 6B. FIGS. 6A and 6B are diagrams showing examples of radar charts. FIG. 6A shows a radar chart in a standard mode, and FIG. 6B shows a radar chart in a comparison mode.

For radar charts, the classification axes may be either entered by the user through information processing terminal 10 or described in the program. If the number of classification axes is smaller than a certain value, then the classification axes do not need to be narrowed down. The radar charts shown in FIGS. 6A and 6B have coordinate axis X1 through X5. The coordinates of the radar charts are calculated on the basis of evaluation points (positive count−negative count) which are represented by relative values in a range having a minimum value of 0 and a maximum value of 100.

A process of generating the radar chart in the standard mode shown in FIG. 6A will be described below.

First, POINT(AX1)=((AX1posi-AX1nega)−MIN(X1))×100/(MAX(X1)−MIN(X1)) is calculated. POINT(AX1) indicates the coordinate of commercial product A on classification axis X1. Similarly, the coordinates of commercial product A on classification axes X2 through X5 are calculated. Then, the calculated coordinates are interconnected by a polygonal curve. The coordinates of commercial products B, C on classification axes X1 through X5 are also calculated, and the calculated coordinates are interconnected by polygonal curves. In FIG. 6A, commercial product A is indicated by the broken-line polygonal curve, commercial product B by the dot-and-dash-line polygonal curve, and commercial product C by the solid-line polygonal curve.

The radar chart in the comparison mode shown in FIG. 6B has one commercial product designated as a target commercial product and other commercial products evaluated in comparison with the target commercial product. The radar chart in the comparison mode is mainly used to compare commercial products in comparison with a target commercial product. A process of generating the radar chart in the comparison mode shown in FIG. 6B will be described below.

First, evaluation points of a target commercial product, which is commercial product A in FIG. 6B, are placed at coordinates 50 on all classification axes X1 through X5. Then, P_POINT(BX1)=50+0.5×(POINT(BX1)−POINT(AX1)) is calculated. POINT(BX1) indicates the coordinate of commercial product B on classification axis X1. Similarly, the coordinates of commercial product A on classification axes X2 through X5 are calculated. Then, the calculated coordinates are interconnected by a polygonal curve. The coordinates of commercial product C on classification axes X1 through X5 are also calculated, and the calculated coordinates are interconnected by a polygonal curve. In FIG. 6B, commercial product A is indicated by the broken-line polygonal curve, commercial product B by the dot-and-dash-line polygonal curve, and commercial product C by the solid-line polygonal curve.

A process of generating a map diagram will be described below. FIG. 7 is a diagram showing an example of a map diagram.

In FIG. 7, classification axis X1 is set on horizontal axis X and classification axis X2 is set on vertical axis Y. The classification axes may be either entered by the user through information processing terminal 10 or described in the program. The coordinates of the map diagram are calculated on the basis of evaluation points (positive count-negative count) which are represented by relative values in a range having a minimum value of 1 and a maximum value of −1. The X coordinate of commercial product z is indicated by x_POINT (z) and the Y coordinate thereof by y_POINT(z). Examples of coordinates are shown below.

$$x\_POINT(A)=((AX1posi-AX1nega)-MIN(X1))\times 2/(MAX(X1)-MIN(X1))-1$$

$$y\_POINT(B)=((BX2posi-BX2nega)-MIN(X2))\times 2/(MAX(X2)-MIN(X2))-1$$

The map diagram shown in FIG. 7 illustrates marks plotted therein which correspond to the coordinates of commercial products A, B, C with respect to classification axes X1, X2.

Visualizing means 23 sends graph drawing data, which are data for plotting either one of the graphs thus generated, to information processing terminal 10. When information processing terminal 10 receives the graph drawing data sent from server apparatus 20, information processing terminal 10 displays a graph based on the received graph drawing data.

EXAMPLE 1

An example of the information processing method according to the first exemplary embodiment will be described below. In the present example, it is assumed that server apparatus 20 generates a bubble chart in response to an analysis request signal from information processing terminal 10 and sends graph drawing data for plotting the generated bubble chart to information processing terminal 10.

When the user operates information processing terminal 10 to enter the product names of a plurality of commercial products to be analyzed, information processing terminal 10 generates blog data acquisition retrieval formulas using the product names of the commercial products as keywords, and sends an analysis request signal including information representative of the blog data acquisition search formulas to server apparatus 20. It is assumed that the commercial products to be analyzed are two personal computers manufactured by two different manufacturers and these two personal computers have respective product names "Personal Computer A", "Personal Computer B".

When controller 21 of server apparatus 20 receives the analysis request signal from information processing terminal 10, controller 21 retrieves texts including the product names that match the keywords from the texts stored in text DB 30, using the blog data acquisition search formulas included in the analysis request signal, and stores the retrieved texts into memory device 25.

Text DB 30 itself may be a server apparatus. In this case, server apparatus 20 sends an analysis request signal received from information processing terminal 10 as a data acquisition request to text DB 30. In response to the data acquisition request from server apparatus 20, text DB 30 retrieves texts including the product names that match the keywords from the texts stored in a database thereof, and sends the retrieved texts to server apparatus 20, which then stores the retrieved texts into memory device 25.

FIG. 8 is a diagram showing an example of a blog which may be one of the texts stored in memory device 25. As shown in FIG. 8, "Personal Computer A" is referred to in a sentence included in the text of the blog. When analyzing means 22 receives the sentence including the product name from memory device 25, analyzing means 22 performs a language and syntax analysis on sentences by separating the sentence into words and analyzing modification relations between the words. Specifically, analyzing means 22 separates the sentence "Company A has announced Personal Computer A as a new product at a cheap price" into words "Company A/has/ announced/Personal Computer A/as/a/new product/at/a/ cheap price/".

The result of the language and syntax analysis indicates "Company A [noun]→has announced [verb], Personal Computer A [noun]→price [noun], Personal Computer A [noun] →low [adjective], Personal Computer A [noun]→new product [noun], Personal Computer A [noun]→has announced [verb], price [noun]→low [adjective], low [adjective]→new product [noun], and new product [noun]→has announced [verb].

Then, analyzing means 22 extracts information (opinion information) of the modification relations: noun→verb, noun→adjective, verb→noun, and adjective→noun from the analyzed modification relations. At this time, analyzing means 22 converts the modification relations: verb→noun and adjective→noun into modification relations: noun→verb and noun→adjective, respectively.

Therefore, the opinion information represents "Company A [noun]→has announced [verb], Personal Computer A [noun]→low [adjective], Personal Computer A [noun]→has announced [verb], price [noun]→low [adjective], new product [noun]→has announced [verb], and new product [noun] →low [adjective].

Analyzing means 22 then performs a matching process on the list of evaluation expressions stored in memory device 25 and the evaluation expressions which correspond to the modified parts in the extracted opinion information, and extracts the opinion information of the evaluation expressions which are in conformity with the evaluation expressions of the stored list, as reputation information. Analyzing means 22 then assigns positive/negative values that have been related to evaluation expressions of the list, the reputation information with respect to the corresponding attribute expressions.

It is assumed that the evaluation expressions of the list stored in memory device 25 include cheap (positive), good (positive), like (positive), quick (positive), light (positive), tacky (negative), dislike (negative), heavy (negative), . . . , etc. Of these evaluation expressions of the list, cheap price (positive), good (positive), like (positive), quick (positive), and light (positive) correspond to phrases of the first kind according to the present invention, and tacky (negative), dislike (negative), heavy (negative) correspond to phrases of the second kind according to the present invention.

The results of the matching process are shown below. An attribute expression, evaluation expression, and a matching process result are given for each opinion information.

Company A (attribute expression)→has announced (evaluation expression): not matched Personal Computer A (attribute expression)→cheap (evaluation expression): matched Personal Computer A (attribute expression)→has announced (evaluation expression): not matched Price (attribute expression)→cheap (evaluation expression): matched Product (attribute expression)→has announced (evaluation expression): not matched New product (attribute expression)→cheap (evaluation expression): matched From the above matching process results, there are extracted three pieces of evaluation information as follows:

Personal Computer A→cheap (positive)
Price→cheap (positive)
New product→cheap (positive)

Visualizing means 23 generates a list of classification axes related to the extracted reputation information, using the list of words stored in memory device 25. One classification axis may be related to a plurality of pieces of reputation information. An example of the list of words is shown below.

(Classification axis) price: (attribute information, evaluation information) price, value, cheap, . . .
(Classification axis) design: (attribute information, evaluation information) compact, color, style, cool, . . .
(Classification axis) specification: (attribute information, evaluation information) processing, operation, memory, . . .

An example of the generated list of classification axes is shown below. (Evaluation information) Personal Computer A→cheap, price→cheap, new product→cheap ⇒ (classification axis) price In the present exemplary embodiment, one commercial product has been described on the basis of one sentence. However, other sentences, other texts, and other commercial products are also processed similarly. It is assumed that other sentences and other texts have also been processed in the description which follows.

Then, visualizing means 23 generates a bubble chart using an established classification axis, as follows: If there are two commercial products involved, then a bubble chart has two axes, and if there are three commercial products involved, then a bubble chart has three axes. If each axis represents a commercial product rather than (commercial product×classification axis), then an attribute expression may be used as a classification axis. After commercial products for which a graph is to be generated are selected, reputation information including attribute expressions which are common to the commercial products is compared and extracted, and the extracted information is processed as described below to generate a graph.

Visualizing means 23 adds and accumulates the numbers of flags indicative of positives and negatives per attribute expression, using the evaluation information, per commercial product (or commercial product×classification axis (in this case, controller 21 of server apparatus 20 recognizes a selected classification axis that is entered into information processing terminal 10 by the user)).

FIG. 9 is a table of accumulated counts of positives and negatives. FIG. 9 shows in the table accumulated counts of positives and negatives for Personal Computer A and Personal Computer B with respect to each of the attribute expressions: "price", "performance", and "design". Though other attribute expressions than those shown in FIG. 9 may be used, the attribute expressions to be discussed are limited to those shown in FIG. 9 for the sake of brevity.

Visualizing means 23 calculates an evaluation point (positive count−negative count) with respect to each of the attribute expressions per commercial product (or commercial product×classification axis).

POINT(A,W) refers to an evaluation point with respect to attribute expression "W" for "Personal Computer A".

POSI(A,W) refers to a positive value with respect to attribute expression "W" for "Personal Computer A".

NEGA(A,") refers to a negative value with respect to attribute expression "W" for "Personal Computer A".

The evaluation point with respect to attribute expression "W" for commercial product "Personal Computer A" is determined by the following equation:

$$POINT(A,W)=POSI(A,W)-NEGA(A,")$$

An evaluation point with respect to attribute expression "price" for commercial product "Personal Computer A" is given as POINT(Personal Computer A, price)=POSI(Personal Computer A, price)−NEGA(Personal Computer A, price)=80−5=75. Evaluation points with respect to other attribute expressions "performance" and "design" are similarly calculated as POINT(Personal Computer A, performance)=40 and POINT(Personal Computer A, design)=−55.

Evaluation points with respect to attribute expressions "price", "performance", and "design" for commercial product "Personal Computer B" are calculated as POINT (Personal Computer B, price)=−10, POINT(Personal Computer B, performance)=60, and POINT(Personal Computer B, design)=93. The calculated evaluation points are illustrated in FIG. 9.

Then, visualizing means 23 calculates coordinates with respect to each of the attribute expressions per commercial product (or commercial product×classification axis). First, visualizing means 23 extracts a greatest evaluation point and a smallest evaluation point from the calculated evaluation points. Then, visualizing means 23 judges whether each of the evaluation points is positive or negative, and divides it by the greatest evaluation point, thereby calculating a coordinate in the range from −1 to 1.

Specifically, horizontal axis X represents product "Personal Computer A" and vertical axis Y product (Personal Computer B".

Product "Personal Computer A" and attribute expression "W" have an X coordinate=X(A, W).

Product "Personal Computer B" and attribute expression "W" have a Y coordinate=Y(B, W).

A greatest evaluation point for product "Personal Computer A" is extracted as MAXPOINT(A).

A greatest evaluation point for product "Personal Computer B" is extracted as MAXPOINT(B).

A smallest evaluation point for product "Personal Computer A" is extracted as MINPOINT(A).

A smallest evaluation point for product "Personal Computer B" is extracted as MINPOINT(B).

Then, the X, coordinates are determined as follows:

$$\text{If } POINT(A,W) \geq 0, \text{ then } X(A,W)=POINT(A,W)/\text{MAXPOINT}(A).$$

$$\text{If } POINT(A,W)<0, \text{ then } X(A,W)=POINT(A,W)/\text{MAXPOINT}(A)\times(-1).$$

The greatest and smallest evaluation points for product "Personal Computer A" and product "Personal Computer B" are given as follows:

MAXPOINT(Personal Computer A)=75
MINPOINT(Personal Computer A)=−55
MAXPOINT(Personal Computer B)=93
MINPOINT(Personal Computer B)=−10

Since POINT(Personal Computer A, price)=75≥0, X(Personal Computer A, price)=POINT(Personal Computer A, price)/MAXPOINT(Personal Computer A)=75/75=1.0.

Since POINT(Personal Computer A, performance)=40≧0, X(Personal Computer A, performance)=POINT(Personal Computer A, performance)/MAXPOINT(Personal Computer A)=40/75=0.53.

Since POINT(Personal Computer A, design)=−55<0, X(Personal Computer A, design)=POINT(Personal Computer A, design)/MINPOINT(Personal Computer A)×(−1)=−55/−55×−1=−1.0.

Since POINT(Personal Computer B, price)=−10<0, Y(Personal Computer B, price)=POINT(Personal Computer B, price)/MINPOINT(Personal Computer B)×(−1)=−10/−10×−1=−1.0.

Since POINT(Personal Computer B, performance)=60≧0, Y(Personal Computer B, performance)=POINT(Personal Computer B, performance)/MAXPOINT(Personal Computer B)=60/93=0.65.

Since POINT(Personal Computer B, design)=93≧0, Y(Personal Computer B, design)=POINT(Personal Computer B, design)/MAXPOINT(Personal Computer B)=93/93=1.0.

Thereafter, visualizing means 23 totals the positive counts and the negative counts for designated commercial products (or commercial products×classification axes) with respect to the respective attribute expressions, thereby calculating circle sizes. Then, visualizing means 23 extracts a maximum value of the circle sizes, and classifies the circle sizes into 10 levels by way of normalization. Visualizing means 23 may classify the circle sizes into more or fewer levels than the 10 levels.

If the circle size for attribute expression "W" is referred to as circle size (W), then circle size (W) is given as circle size (W)=POS(A,W)+NEGA(A,W)+POSI(B,W)+NEGA(B,W). It is assumed that a maximum value of the circle sizes (MAX circle size) is of Level 10, and circle size (W) is of Level (W). If circle size (W)=MAX circle size, then Level(W)=10.

If circle size (W)<MAX circle size, then Level(W)=int (circle size (W)/MAX circle size×10)+1 where int(numerical value) means that the digits after the decimal point of the numerical value are truncated. If the digits after the decimal point of the numerical value are rounded up, then Level(W) =round-up(circle size (W)/MAX circle size×10) for all cases.

The circle sizes for the example given in the table shown in FIG. 9 are as follows:

Circle size (price)=80+5+30+40=155
Circle size (performance)=70+30+80+20=200
Circle size (design)=5+60+96+2=162
MAX circle size=200

Since the circle size (price)<the MAX circle size, Level (price)=int(155/200×10)+1=8. Since the circle size (performance)=the MAX circle size, Level (performance)=10. Since the circle size (design)<the MAX circle size, Level (design) =int(162/200×10)+1=9.

Visualizing means 23 generates graph drawing data for plotting a graph on information processing terminal 10, using coordinates X(A,W), Y(B,W) and circle size levels Level(W) calculated with respect to respective attribute expressions (W).

Figure 10:
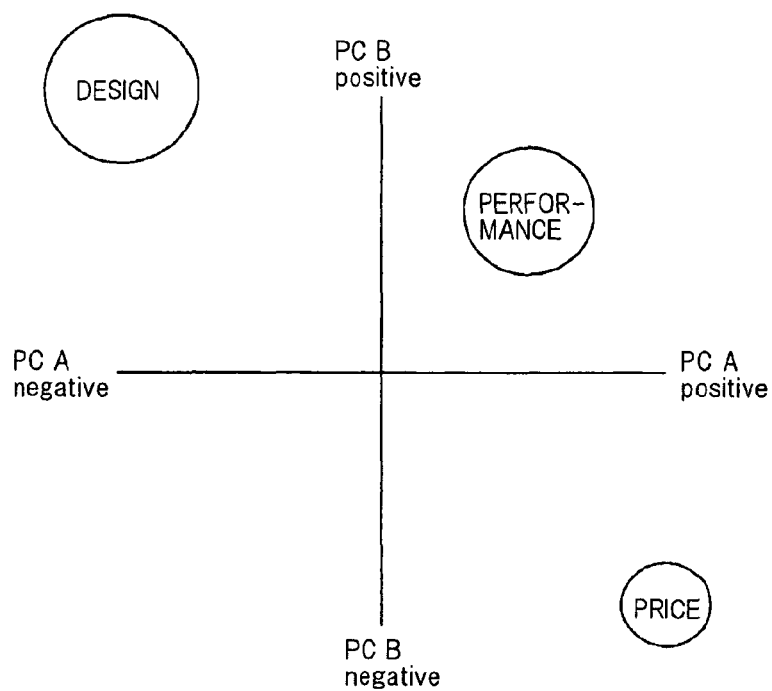
FIG. 10 is a diagram showing a bubble chart generated by Example 1.

FIG. 10 is a diagram showing a bubble chart generated by Example 1 in the manner described above. It can be seen from FIG. 10 that Personal Computer A has a better reputation than Personal Computer B in terms of the price, a poorer reputation than Personal Computer B in terms of the design, and about the same reputation as Personal Computer B in terms of the performance.

Visualizing means 23 sends the generated graph drawing data to information processing terminal 10 which has sent the analysis request signal.

In the bubble chart according to Example 1, the product names are represented by the coordinate axes. However, combinations of product names and classification axes may be represented by coordinate axes, and a bubble chart may be generated using only attribute expressions that are related to the product names and the classification axes.

(2nd Exemplary Embodiment)

Figure 11A:
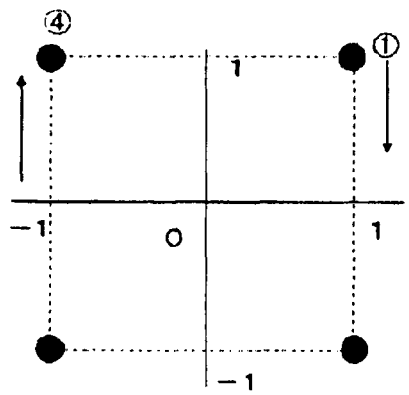
FIGS. 11A and 11B are diagrams which are illustrative of an information processing method according to a second exemplary embodiment of the present invention.
Figure 11B:
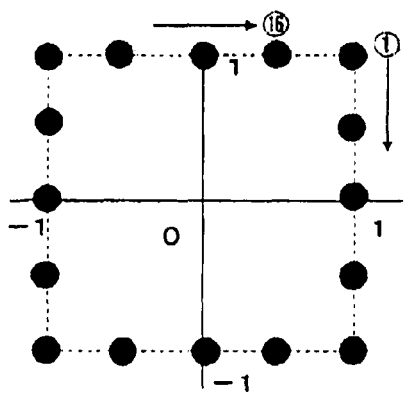

The graph drawing data described in the first exemplary embodiment may possibly include data (hereinafter referred to as "plotting data") with respect to a great number of attribute expressions (W) which may range from several tens of attribute expressions to several tens of thousand attribute expressions. If all those plotting data are drawn on a bubble chart, then some of them may overlap each other, tending to make the bubble chart too crowded for the user to interpret clearly. According to the second exemplary embodiment, only plotting data with obvious features are automatically extracted. According to the second exemplary embodiment, visualizing means 23 stores calculated graph drawing data into memory device 25, and thereafter processes the graph drawing data according to processes 1 through 3 described below. FIGS. 11A and 11B are diagrams which are illustrative of an information processing method according to the second exemplary embodiment.

Process 1: Visualizing means 23 reads graph drawing data including calculated coordinates X(A,W), Y(A,W) and circle size levels Level (W) for each of attribute expressions (W) from memory device 25.

Process 2: Visualizing means 23 calculates automatic setting points successively at existing end points (indexes) (e.g., 4 or 16 points) on the bubble chart and plot data of the read graph drawing data, according to the equation, shown below, using a distance and a size. FIG. 11A shows bubble charts with 4 existing end points, and FIG. 11B shows bubble charts with 16 existing end points.

Automatic setting point: P(w,index)=1/distance from end point (index)+size (w)/10

Process 3: Visualizing means 23 employs plotting data with high automatic setting points (e.g., highest and second highest points) as graph drawing data for each of the calculated existing end points, and stores the graph drawing data thus determined into memory device 25.

Figure 12:
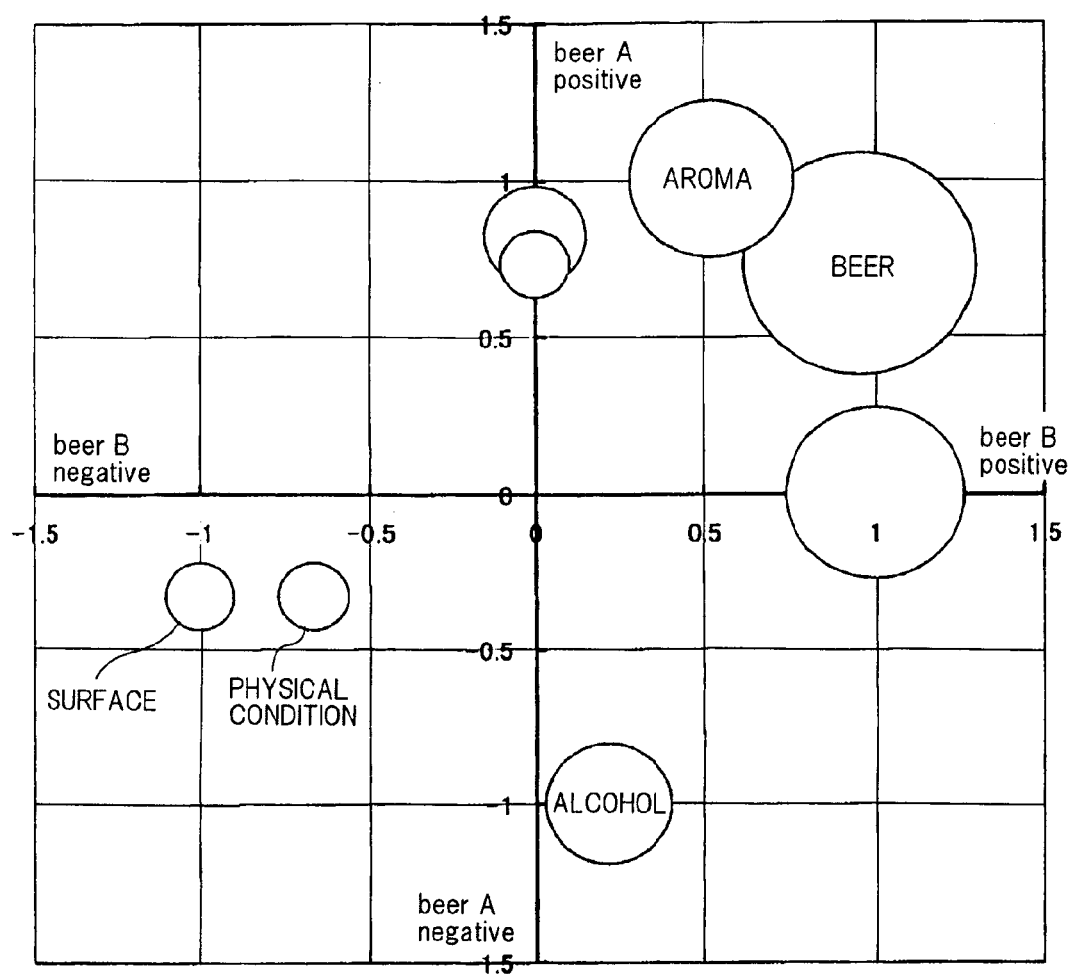
FIG. 12 is a diagram showing a bubble chart generated according to the second exemplary embodiment.

FIG. 12 is a diagram showing a bubble chart generated according to the second exemplary embodiment. The bubble chart shown in FIG. 12 is generated by calculating an automatic setting point for each of the attribute setting points plotted on the bubble chart shown in FIG. 5 at each of 4 end points, and employing attribute expressions with high automatic setting points (e.g., highest and second highest points). In this manner, the number of attribute expressions that are plotted is narrowed down from 32 shown in FIGS. 5 to 8.

If a bubble chart is used as a graph for comparing different reputations of commercial products, then the features of the commercial products may not possibly be clearly recognized because the number of attribute expressions involved ranges from several hundreds several tens of thousands. According to the present exemplary embodiment, however, attribute expressions with obvious product features can automatically selected from a large amount of attribute information.

In the illustrated exemplary embodiment, 4 and 16 existing end points are used.

However, the number of existing end points that can be used is optional. The user may operate information processing terminal 10 to specify any number of existing end points to be used.

When visualizing means 23 performs the above process 3 successively at the existing end points, if plotting data already employed at the end of the process 3 for one existing end point are selected in the process 3 for a subsequent existing end point, then plotting data of a lower rank may be employed.

In the above exemplary embodiments and the example, each of the above graph generating processes uses normalized points (−1 through 1, 0 through 100). The present invention, however, may use other values, such as real number values, for generating graphs. The types of graphs to be generated are not limited to bubble charts, radar charts, and map diagrams, but may be bar graphs or other graphs.

While sentences such as a blog and a news article have been described above as texts to be analyzed, any other sentences in the form of text data may be analyzed according to the present invention.

Only the graph generating function for generating bubble charts or the like, not in combination with evaluation information, may be used in other applications, such as marketing. For example, a bubble chart may be generated which has axes X and Y indicative of the differences between the sales for the present and last years, or the differences between the numbers of employees for the present and last years, and circle sizes indicative of average wages, for automatically indicating distinguishing companies which have been rapidly growing or declining.

According to the first or second exemplary embodiment, as described above, a graph representative of the difference between counts for at least two types of reputations is automatically generated.

An exemplary advantage according to the invention is that a graph for comparing reputations with respect to a plurality of commercial products can automatically generated. Therefore, the reputations with respect to the commercial products can easily be compared with each other on the generated graph. Even if a lot of information presented by blogs presented on a network are to be analyzed, the labor force of people involved in analyzing the blog texts is reduced, and a graph for comparing a plurality of commercial products can be generated easily based on the analyzed blog texts. It is also possible to provide the user with a report on an analysis of reputations of the commercial products.

While the invention has been particularly shown and described with reference to exemplary embodiments and examples thereof, the invention is not limited to these embodiments and examples. It will be understood by those of ordinary skill in the art that various changes in form and details may be made therein without departing from the spirit and scope of the present invention as defined by the claims.

What is claimed is:

1. An information processing apparatus comprising:
a memory device for storing a list of evaluation expressions including a list of first phrases which are classified as belonging to a first kind as expressions of evaluation of commercial products and a list of second phrases which are classified as belonging to a second kind that differs from said first kind, and
a controller acquiring texts including each of a plurality of commercial product names to be analyzed, with respect to the respective commercial product names, from a storage device when said plurality of commercial product names are entered into said controller, extracting said first phrases and said second phrases respectively from the acquired texts with respect to said commercial product names, and generating a graph representing evaluation points as values corresponding to the differences between counts of said first phrases and said second phrases,
wherein said controller extracts evaluation information representing modification relations between nouns as a type of attribute expressions and verbs or adjectives as a type of evaluation expressions, from the acquired texts about said commercial product names from said storage device, extracts reputation information including said first phrases and said second phrases in modified parts of the extracted evaluation information, and calculates the difference between the number of pieces of the reputation information including said first phrases and the number of pieces of the reputation information including said second phrases with respect to each of said attribute expressions, thereby determining said evaluation points, and then generates, as said graph, a bubble chart having coordinate axes representing said commercial product names and circles having sizes corresponding to the numbers of pieces of the reputation information, said circles being located at coordinates calculated from said evaluation points for the commercial product names with respect to each of said attribute expressions,
wherein it assumed that W1 to Wm (m is an integer which is equal to or greater than 2) are kinds of attribute expressions which are extracted from the acquired texts and index 1 to index n (n is an integer which is equal to or greater than 2) are a plurality of existing points around said bubble chart, and
score P (Wi, index j) which is based on a distance Xij from index j (j is greater than or equal to 1, is less than or equal to n) and on a size for said circle of attribute expression Wi (i is greater than or equal to 1, is less than or equal to m) is determined by the equation, P (Wi, index j)=1/Xij+ wi/10,
when said controller generates said bubble chart, said controller calculates each P (Wi, index j) when j changes 1 through n in each i which changes 1 through m by using the equation, selects attribute expressions Wi of a predetermined higher number regarding said score based on scores P (Wi, index j) calculated about index 1 through index n, and plots said circles which correspond to selected attribute expressions Wi on said bubble chart.

2. An information processing apparatus comprising:
a memory device for storing a list of evaluation expressions including a list of first phrases which are classified as belonging to a first kind as expressions of evaluation of commercial products and a list of second phrases which are classified as belonging to a second kind that differs from said first kind, and storing a list of words for determining which classification axes attribute expressions or evaluation expressions of the evaluation information are to be related to; and
a controller acquiring texts including each of a plurality of commercial product names to be analyzed, with respect to the respective commercial product names, from a storage device when said plurality of commercial product names are entered into said controller, extracting said first phrases and said second phrases respectively from the acquired texts with respect to said commercial product names, and generating a graph representing evaluation points as values corresponding to the differences between counts of said first phrases and said second phrases,
wherein said controller extracts evaluation information representing modification relations between nouns as a type of attribute expressions and verbs or adjectives as a type of evaluation expressions, from the acquired texts about said commercial product names from said storage device, extracts reputation information including said first phrases and said second phrases in modified parts of the extracted evaluation information, and calculates the difference between the number of pieces of the reputation information including said first phrases and the number of pieces of the reputation information including said second phrases with respect to each of said attribute expressions, thereby determining said evaluation points, and then refers to the list of words stored in said memory device and generates a list of classification axes related to the reputation information including said first phrases and said second phrases, and generates, as said graph, a bubble chart having coordinate axes representing combinations of said commercial product names and said classification axes and circles having sizes corresponding to the numbers of pieces of the reputation information, said circles being located at coordinates calculated from said evaluation points for the commercial product names with respect to each of said attribute expressions related to said commercial product names and said classification axes, wherein it assumed that W1 to Wm (m is an integer which is equal to or greater than 2) are kinds of attribute expressions which are extracted from the acquired texts and index 1 to index n (n is an integer which is equal to or greater than 2) are a plurality of existing points around said bubble chart, and score P (Wi, index j) which is based on a distance Xij from index j (j is greater than or equal to 1, is less than or equal to n) and on a size for said circle of attribute expression Wi (i is greater than or equal to 1, is less than or equal to m) is determined by the equation, P (Wi, index j)=1/Xij+ wi/10, when said controller generates said bubble chart, said controller calculates each P (Wi, index j) when j changes 1 through n in each i which changes 1 through m by using the equation, selects attribute expressions Wi of a predetermined higher number regarding said score based on scores P (Wi, index j) calculated about index 1 through index n, and plots said circles which correspond to selected attribute expressions Wi on said bubble chart.

3. An information processing method, performed by an information processing apparatus that includes a memory device and a controller and that is connected to a storage device, comprising:

said controller stores a list of evaluation expressions including a list of first phrases which are classified as belonging to a first kind as expressions of evaluation of commercial products and a list of second phrases which are classified as belonging to a second kind that differs from said first kind in said memory device;

said controller acquires texts including each of a plurality of commercial product names to be analyzed, with respect to the respective commercial product names, from said storage device when the commercial product names are entered;

said controller extracts said first phrases and said second phrases respectively from the acquired texts with respect to said commercial product names respectively, and said controller generates a graph representing evaluation points as values corresponding to the differences between counts of said first phrases and said second phrases, with respect to the respective commercial product names, wherein when said controller generates said graph, said controller extracts evaluation information representing modification relations between nouns as a type of attribute expressions and verbs or adjectives as a type of evaluation expressions, from the acquired texts about the commercial product names;

said controller extracts reputation information including said first phrases and said second phrases in modified parts of the extracted evaluation information;

after extracting said reputation information, said controller calculates the difference between the number of pieces of the reputation information including said first phrases and the number of pieces of the reputation information including said second phrases with respect to each of said attribute expressions, thereby determining said evaluation points; and after determining said evaluation, said controller generates, as said graph, a bubble chart having coordinate axes representing said commercial product names and circles having sizes corresponding to the numbers of pieces of the reputation information, said circles being located at coordinates calculated from said evaluation points for the commercial product names with respect to each of said attribute expressions, wherein it assumed that W1 to Wm (m is an integer which is equal to or greater than 2) are kinds of attribute expressions which are extracted from the acquired texts and index 1 to index n (n is an integer which is equal to or greater than 2) are a plurality of existing points around said bubble chart, and score P (Wi, index j) which is based on a distance Xij from index j (j is greater than or equal to 1, is less than or equal to n) and on a size for said circle of attribute expression Wi (i is greater than or equal to 1, is less than or equal to m) is determined by the equation, P (Wi, index j)=1/Xij+ wi/10, when said controller generates said bubble chart, said controller calculates each P (Wi, index j) when j changes 1 through n in each i which changes 1 through m by using the equation;

said controller selects attribute expressions Wi of a predetermined higher number regarding said score based on scores P (Wi, index j) calculated about index 1 through index n, and said controller plots said circles which correspond to selected attribute expressions Wi on said bubble chart.

4. An information processing method, performed by an information processing apparatus that includes a memory device and a controller and that is connected to a storage device, comprising:

said controller stores a list of evaluation expressions including a list of first phrases which are classified as belonging to a first kind as expressions of evaluation of commercial products and a list of second phrases which are classified as belonging to a second kind that differs from said first kind and a list of words for determining which classification axes attribute expressions or evaluation expressions of the evaluation information are to be related to, in said memory device;

said controller acquires texts including each of a plurality of commercial product names to be analyzed, with respect to the respective commercial product names, from said storage device when the commercial product names are entered;

said controller extracts said first phrases and said second phrases respectively from the acquired texts with respect to said commercial product names respectively, and said controller generates a graph representing evaluation points as values corresponding to the differences between counts of said first phrases and said second phrases, with respect to the respective commercial product names, wherein when said controller generates said graph, said controller extracts evaluation information representing modification relations between nouns as a type of attribute expressions and verbs or adjectives as a type of evaluation expressions, from the acquired texts about the commercial product names;

said controller extracts reputation information including said first phrases and said second phrases in modified parts of the extracted evaluation information;

after extracting said reputation information, said controller calculates the difference between the number of pieces of the reputation information including said first phrases and the number of pieces of the reputation information including said second phrases with respect to each of said attribute expressions, thereby determining said evaluation points;

said controller refers to the list of words stored in said memory device and generates a list of classification axes related to the reputation information including said first phrases and said second phrases; and said controller generates, as said graph, a bubble chart having coordinate axes representing combinations of said commercial product names and said classification axes and circles having sizes corresponding to the numbers of pieces of the reputation information, said circles being located at coordinates calculated from said evaluation points for the commercial product names with respect to each of said attribute expressions related to said commercial product names and said classification axes, wherein it assumed that W1 to Wm (m is an integer which is equal to or greater than 2) are kinds of attribute expressions which are extracted from the acquired texts and index 1 to index n (n is an integer which is equal to or greater than 2) are a plurality of existing points around said bubble chart, and score P (Wi, index j) which is based on a distance Xij from index j (j is greater than or equal to 1, is less than or equal to n) and on a size for said circle of attribute expression Wi (i is greater than or equal to 1, is less than or equal to m) is determined by the equation, P (Wi, index j)=1/Xij+ wi/10, when said controller generates said bubble chart, said controller calculates each P (Wi, index j) when j changes 1 through n in each i which changes 1 through m by using the equation;

said controller selects attribute expressions Wi of a predetermined higher number regarding said score based on scores P (Wi, index j) calculated about index 1 through index n, and said controller plots said circles which correspond to selected attribute expressions Wi on said bubble chart.

5. A recording medium storing therein a program to be executed by a computer for performing a process comprising:

storing a list of evaluation expressions including a list of first phrases which are classified as belonging to a first kind as expressions of evaluation of commercial products and a list of second phrases which are classified as belonging to a second kind that differs from said first kind in a memory device of said computer;

acquiring texts including each of a plurality of commercial product names to be analyzed, with respect to the respective commercial product names, from a storage device which is connected to said computer when the commercial product names are entered;

extracting said first phrases and said second phrases from the acquired texts with respect to said commercial product names respectively; and generating a graph representing evaluation points as values corresponding to the differences between counts of said first phrases and said second phrases, with respect to the respective commercial product names, wherein when said graph generated, extracting evaluation information representing modification relations between nous as a type of attribute expressions and verbs or adjectives as a type of evaluation expressions, from the acquired texts about the commercial product names;

extracting reputation information including said first phrases and said second phrases in modified parts of the extracted evaluation information;

after extracting said reputation information, calculating the difference between the number of pieces of the reputation information including said first phrases and the number of pieces of the reputation information including said second phrases with respect to each of said attribute expressions, thereby determining said evaluation points; and after determining said evaluation, generating, as said graph, a bubble chart having coordinate axes representing said commercial product names and circles having sizes corresponding to the numbers of pieces of the reputation information, said circles being located at coordinates calculated from said evaluation points for the commercial product names with respect to each of said attribute expressions, wherein it assumed that W1 to Wm (m is an integer which is equal to or greater than 2) are kinds of attribute expressions which are extracted from the acquired texts and index 1 to index n (n is an integer which is equal to or greater than 2) are a plurality of existing points around said bubble chart, and score P (Wi, index j) which is based on a distance Xij from index j (j is greater than or equal to 1, is less than or equal to n) and on a size for said circle of attribute expression Wi (i is greater than or equal to 1, is less than or equal to m) is determined by the equation, P (Wi, index j)=1/Xij+ wi/10, when generating said bubble chart, said controller calculates each P (Wi, index j) when j changes 1 through n in each i which changes 1 through m by using the equation;

selecting attribute expressions Wi of a predetermined higher number regarding said score based on scores P (Wi, index j) calculated about index 1 through index n, and plotting said circles which correspond to selected attribute expressions Wi on said bubble chart.

6. A recording medium storing therein a program to be executed by a computer for performing a process comprising:

storing a list of evaluation expressions including a list of first phrases which are classified as belonging to a first kind as expressions of evaluation of commercial products and a list of second phrases which are classified as belonging to a second kind that differs from said first kind and a list of words for determining which classification axes attribute expressions or evaluation expressions of the evaluation information are to be related to, in a memory device of said computer;

acquiring texts including each of a plurality of commercial product names to be analyzed, with respect to the respective commercial product names, from a storage device which is connected to said computer when the commercial product names are entered;

extracting said first phrases and said second phrases from the acquired texts with respect to said commercial product names respectively; and generating a graph representing evaluation points as values corresponding to the differences between counts of said first phrases and said second phrases, with respect to the respective commercial product names, wherein when said graph generated, extracting evaluation information representing modification relations between nouns as a type of attribute expressions and verbs or adjectives as a type of evaluation expression, from the acquired texts about the commercial product names;

extracting reputation information including said first phrases and said second phrases in modified parts of the extracted evaluation information;

after extracting said reputation information, calculating the difference between the number of pieces of the reputation information including said first phrases and the number of pieces of the reputation information including said second phrases with respect to each of said attribute expressions, thereby determining said evaluation points;

referring to the list of words stored in said memory device and generating a list of classification axes related to the reputation information including said first phrases and said second phrases; and generating, as said graph, a bubble chart having coordinate axes representing combinations of said commercial product names and said classification axes and circles having sizes corresponding to the numbers of pieces of the reputation information, said circles being located at coordinates calculated from said evaluation points for the commercial product names with respect to each of said attribute expressions related to said commercial product names and said classification axes;

wherein it assumed that W1 to Wm (m is an integer which is equal to or greater than 2) are kinds of attribute expressions which are extracted from the acquired texts and index 1 to index n (n is an integer which is equal to or greater than 2) are a plurality of existing points around said bubble chart, and score P (Wi, index j) which is based on a distance Xij from index j (j is greater than or equal to 1, is less than or equal to n) and on a size for said circle of attribute expression Wi (i is greater than or equal to 1, is less than or equal to m) is determined by the equation, P (Wi, index j)=1/Xij+ wi/10, when generating said bubble chart, said controller calculates each P (Wi, index j) when j changes 1 through n in each i which changes 1 through m by using the equation;

selecting attribute expressions Wi of a predetermined higher number regarding said score based on scores P (Wi, index j) calculated about index 1 through index n, and plotting said circles which correspond to selected attribute expressions Wi on said bubble chart.

\* \* \* \* \*